United States Patent [19]

Humphrey

[11] 4,146,658

[45] Mar. 27, 1979

[54] PROCESS FOR PRODUCING AN ULTRAVIOLET LIGHT STABILIZED POLYCARBONATE ARTICLE

[75] Inventor: James S. Humphrey, Mt. Vernon, Ind.

[73] Assignee: General Electric Company, Pittsfield, Mass.

[21] Appl. No.: 895,664

[22] Filed: Apr. 12, 1978

[51] Int. Cl.$^2$ .............................. C08K 5/34; C08K 5/13
[52] U.S. Cl. .............................. 427/160; 260/45.8 NT; 260/45.95 F; 428/412; 427/430 R
[58] Field of Search ................ 260/45.8 NT, 45.95 F; 428/412; 427/160, 430

[56] References Cited

U.S. PATENT DOCUMENTS

| | | | |
|---|---|---|---|
| 2,976,259 | 3/1961 | Hardy et al. | 260/45.95 F |
| 3,104,175 | 9/1963 | Marx, Jr. et al. | 427/160 |
| 3,309,219 | 3/1967 | Etherington | 428/412 |
| 3,309,220 | 3/1967 | Osteen | 427/160 |
| 3,582,398 | 6/1971 | Ringler | 428/412 |
| 3,594,264 | 7/1971 | Urban | 428/412 |
| 3,617,330 | 11/1971 | Peilstocker | 427/160 |
| 3,810,815 | 5/1974 | Welhart et al. | 427/412 |
| 3,843,390 | 10/1974 | Hudson et al. | 428/412 |
| 3,892,889 | 7/1975 | Cohnen et al. | 260/45.95 F |
| 3,987,001 | 10/1976 | Wedel et al. | 427/160 |

*Primary Examiner*—Veronica P. Hoke
*Attorney, Agent, or Firm*—Myron B. Kapustij; William F. Mufatti

[57] ABSTRACT

A process for preparing an ultraviolet light resistant polycarbonate article, which process comprises a surface impregnation of the article by bringing said article into contact with a composition containing (i) an acrylate, (ii) a hydroxy ether, and (iii) an ultraviolet light absorbent.

5 Claims, No Drawings

PROCESS FOR PRODUCING AN ULTRAVIOLET LIGHT STABILIZED POLYCARBONATE ARTICLE

This invention relates to polycarbonate resin and more particulary to a process for producing shaped articles, such as windows, windscreens, and the like, of polycarbonate resin exhibiting superior resistance to ultraviolet radiation.

BACKGROUND OF THE INVENTION

The vast majority of all organic polymeric materials undergo some mode of degradation when exposed to the high energy photons of ultraviolet light. The degradation manifests itself depending on the material in yellowing, discoloration, embrittlement and other loss of physical properties. Polycarbonate resin is no exception and it is, therefore, an object of this invention to provide an improved method of producing a polycarbonate resin article which is highly resistant to ultraviolet radiation degradation.

The use of certain compounds as ultraviolet radiation absorbers is well known in the art. Heretofore, these compounds have been incorporated into the polymer melt prior to forming the structure; coated on the surface of the polymeric structure; or impregnated into the surface of the structure by swelling the substrate by use of a solvent in which the ultraviolet light absorber is dissolved, or by embedding an ultraviolet light absorber in the substrate by melting both the absorber and the surface of the substrate, or by using aqueous solution of absorbers which are more soluble in the polycarbonate substrate than in the aqueous solution. Each of these prior art methods has certain disadvantages. The first method, incorporating the ultraviolet radiation absorbing compound in the melt, distributes the compound throughout the structure. This procedure is both uneconomical, as these compounds are usually quite expensive, and not completely successful. Much of the harmful radiation penetrates and deteriorates the structure before reaching the too well-distributed absorber. Also, the concentration of the absorber in the resin is limited by the degree of compatibility of said compound with the polycarbonate. In the second method, applying a coating of the ultraviolet radiation absorbing compound onto the surface of the article, difficulties are sometimes encountered in adhering the coatings to the surface of the structure. The coatings may not adhere well, or if they do adhere, they often cannot be applied without forming streaks. Furthermore, the coating, which usually contains a polymeric material, may also tend to be degraded by ultraviolet light and peel from the base structure. The various prior art surface impregnation processes also have certain disadvantages. Using a solvent to swell the substrate may, due to the solvent's or swelling agent's active nature, degrade the advantageous and desired properties of the polycarbonate article. Imbedding the compound in the surface of the substrate by melting both the compound and the substrate likewise may tend to degrade the properties of the polycarbonate resin. Using aqueous solutions containing an ultraviolet light absorbent compound which is more soluble in the polycarbonate than in water rather sharply limits the number and type of ultraviolet light absorbent compounds which can be used.

The instant invention provides an economical and effective method for protecting polycarbonate shaped articles from degradation by ultraviolet radiation by incorporating ultraviolet radiation absorbent compounds into the polycarbonate structure so that the compounds are concentrated uniformly at the surface of the polycarbonate structure.

DESCRIPTION OF THE INVENTION

In accordance with the present invention, there is provided a method of producing an ultraviolet light-resistant polycarbonate article comprising the steps of forming an article comprised of polycarbonate resin, applying to the surface of the article a solution comprised of (i) an acrylate swelling agent, (ii) a hydroxy ether mitigating agent, and (iii) an ultraviolet light absorbent, and evaporating the swelling agent and mitigating agent.

In accordance with the invention, an article comprised of polycarbonate resin is formed in a conventional manner, for example by injecting polycarbonate material into a mold. Other methods, such as extrusion, cold forming, vacuum forming, blow molding, compression molding, transfer molding and other methods which will be obvious to one skilled in the art, may be used to form the article. The article may be in any shape and need not be a finished article of commerce, that is, it could be merely sheet material which would be cut or mechanically shaped into a finished article. Therefore, as used herein, it will be understood that the term "article" refers to any shape of polycarbonate resin whether finished or stock material.

The aromatic carbonate polymer used in the practice of the instant invention has recurring units of the formula:

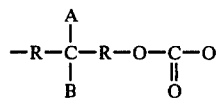

I.

wherein each —R— is selected from the group consisting of phenylene, halo-substituted phenylene and alkyl substituted phenylene; and A and B are each selected from the group consisting of hydrogen, hydrocarbon radicals free from aliphatic unsaturation and of radicals which together with the adjoining

atom form a cycloalkane radical, the total number of carbon atoms in A and B being up to 12.

The aromatic carbonate polymer of this invention may be prepared by methods well known in the art and as described in U.S. Pat. No. 3,989,672, all of which are incorporated by reference.

Also, included herein are branched polycarbonates wherein a polyfunctional aromatic compound is reacted with the dihydric phenol and carbonate precursor to provide a thermoplastic randomly branched polycarbonate wherein the recurring units of formula I. contain branching groups.

The preferred polycarbonate resins may be derived from the reaction of bisphenol-A and phosgene. These polycarbonates have from 10–400 recurring units of the formula:

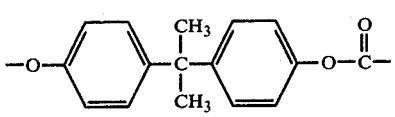 II.

The polycarbonate should have an intrinsic viscosity between 0.3 and 1.0, preferably from 0.40 to 0.65 as measured at 25° C. in methylene chloride.

To this polycarbonate article is applied a solution containing (i) an acrylate swelling agent, (ii) a hydroxy ether mitigating agent, and (iii) an ultraviolet light absorbent. The solution contains sufficient amounts of acrylate swelling and softening agent and hydroxy ether mitigating agent whereby the surface of the polycarbonate article is swelled and softened sufficiently to allow impregnation thereof by the ultraviolet light absorbent but is not softened irreversibly or marred or streaked. Generally, this solution contains, by volume, from about 1% to about 50% of the acrylate swelling agent and from 50% to about 99% of the hydroxy mitigating agent, preferably from about 2% to about 25% of the swelling agent and from about 75% to about 98% of the mitigating agent. The final solution, i.e., the solution containing the aforedescribed proportions of the swelling agent and the mitigating agent, generally contains from about 1.0 to about 30.0 grams of the ultraviolet light absorbent per liter of swelling agent plus mitigating agent, preferably from about 2.0 to about 25.0 grams of ultraviolet light absorbent per liter of swelling agent plus mitigating agent, and more preferably from about 5.0 to about 15.0 grams of ultraviolet light absorbent per liter of swelling agent plus mitigating agent. This solution may contain only one ultraviolet light absorbent or a mixture of different ultraviolet light absorbents. The impregnating solution may also optionally contain other additives such as dyes and antioxidants.

The instant impregnating solution can be applied to the polycarbonate by any of the commonly known methods, e.g., dipping, spraying, brushing, and the like. The solution is kept in contact with the polycarbonate article for a period of time sufficient for the ultraviolet light absorbing compound to effectively impregnate the surface layers of the polycarbonate article, but insufficient for the acrylate swelling agent to deleteriously affect the polycarbonate article. This period of time generally ranges from about 2 to about 30 minutes. While the impregnating solution may be at an elevated temperature, solutions at room temperature can generally be used with excellent results.

The acrylates useful in the present invention are the lower alkyl esters of acrylic acid represented by the general formula

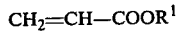 III.

wherein $R^1$ is a lower alkyl group having from 1 to about 8 carbon atoms. Exemplary alkyl groups represented by $R^1$ include methyl, ethyl, n-propyl, isopropyl, n-butyl, isobutyl, sec-butyl, tert-butyl, n-pentyl, isopentyl, neopentyl, n-hexyl, isohexyl, and the like.

Examples of acrylates represented by formula III include methyl acrylate, ethyl acrylate, propyl acrylate, butyl acrylate, and the like.

The hydroxy ethers useful in the practice of the present invention are represented by the general formula

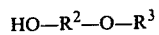 IV.

wherein $R^2$ is selected from the group consisting of $—C_2H_4—$; $—C_3H_6—$; and $—(R^4O)_n—$ wherein $R^4$ is $—C_2H_4—$ or $—C_3H_6—$ and n is an integer having a value of from 1 to 3, and $R^3$ is a lower alkyl group containing from 1 to about 8 carbon atoms.

The ultraviolet light absorbent employed in the practice of this invention can be any of the known ultraviolet light absorbents. The ultraviolet light absorbents particularly useful in the practice of this invention are the benzophenones, substituted benzophenones and benzotriazoles such as set forth in U.S. Pat. Nos. 3,043,709; 3,049,443; and 3,309,220. Some non-limiting examples of suitable ultraviolet light absorbing compounds are 2-hydroxy-4-methoxybenzophenone, 2-hydroxy-4-methoxy-2'-carboxybenzophenone, 2,4-dihydroxybenzophenone, 2,2'-dihydroxy-4-methoxybenzophenone, 2,2'-dihydroxybenzophenone, 2,2',4,4'-tetrahydroxybenzophenone, 2,2'-dihydroxy-4,4'-dimethoxybenzophenone, 2,2'-dihydroxy-4,4'-diethoxybenzophenone, 2,2'-dihydroxy-4,4'-dipropoxybenzophenone, 2,2'-dihydroxy-4,4'-dihydroxy-4,4'-dibutoxybenzophenone, 2,2'-dihydroxy-4-methoxy-4'-ethoxybenzophenone, 2,2'-dihydroxy-4-methoxy-4'-propoxybenzophenone, 2,2'-dihydroxy-4-methoxy-4'-butoxybenzophenone, 2' (2'-hydroxy-5'-methylphenyl)benzotriazole, 2-(2'-hydroxy-5'-tert-butylphenyl) benzotriazole, 2-(2'-hydroxy-3'-methyl-5'-tert-butylphenyl) benzotriazole, 2-(2'-hydroxyp-5'-cyclohexylphenyl)-benzotriazole, 2' (2'-hydroxy-3',5'-dimethylphenyl) benzotriazole, and the like.

The acrylate is the polycarbonate aggressive component of the solution and functions as a softening or swelling agent for the polycarbonate. Once the polycarbonate surface is softened or swelled, the ultraviolet light absorbent diffuses or permeates into the softened surface of the polycarbonate.

The hydroxy ether acts as a mitigating agent for the acrylate. That is, it acts to prevent a too rapid and too aggressive attack by the acrylate upon the polycarbonate, thereby allowing an even and uniform impregnation of the surface of the softened polycarbonate by the ultraviolet light absorbent compound while preventing etching and discoloration of the polycarbonate by the acrylate.

The acrylate and the hydroxy ether are then evaporated from the treated polycarbonate article. The resultant polycarbonate article is resistant to ultraviolet light degradation while at the same time retaining all of the desirable characteristics of an untreated polycarbonate article.

This process is in sharp contrast to the prior art process, as taught, for example, in German Offen. No. 2,211,641, which provides a very active surface impregnation technique wherein small articles are endowed with improved ultraviolet light resistance by a short, e.g., ten second, dipping process. In the prior art, 1,2-dichloroethane is the polycarbonate aggressive component in the surface treatment solutions and is believed to function as a softening or swelling agent for diffusing the ultraviolet light stabilizer into the surface layers of the polycarbonate. However, it is this active nature of the 1,2-dichloroethane which precludes the application of this prior art process to large articles such as sheets because relatively long solution contact times are involved which leads to hazing.

There are other additional difficulties with the prior art processes which are avoided by the process of the present invention. Thus, spray application of prior art solutions containing 1,2-dichloroethane leaves residues, and unless carefully executed, causes runs or pock marks on the surface. If the polycarbonate article is rinsed in butyl alcohol or 2-butoxy ethanol before treatment with the prior art ultraviolet light absorbent containing solutions, rapid and irreversible hazing develops. Thus, a large polycarbonate article, which might have localized surface contaminants that would allow the 1,2-dichloroethane to rapidly wet and attack the surface, would develop irregular haze patterns. The most severe restraint on the use of extremely active surface impregnation solutions, e.g., those containing 1,2-dichloroethane, arises from the consequential softening of the surface beyond the already relatively soft and easily scratched surface of the untreated polycarbonate article.

This phenomenon of irreversible softening when using a solution containing 1,2-dichloroethane versus the temporary softening of the polycarbonate when using the instant solution is quite unexpected and unpredictable and results in obvious advantages from using the instant impregnating solution.

PREFERRED EMBODIMENT OF THE INVENTION

The following examples are set forth to illustrate more clearly the principle and practice of this invention to those skilled in the art.

In accordance with the invention, a solution, solution A, containing 10 parts by volume of butyl acrylate and 90 parts by volume of 2-butoxyethanol is prepared. A second solution, solution B, consisting of 10 parts by volume of butyl acrylate, 90 parts by volume of 2-butoxyethanol, 4% by weight Uvinul ®N-539, an ultraviolet light absorbent produced by GAF Corporation, 2% by weight of Cyasorb ®5411, a benzotriazole based ultraviolet light absorbent produced by American Cyanamid Corp., and 5% of Uvi-Nox ® 1494, a phenol type antioxidant produced by GAF Corporation, is prepared.

Samples 1–4, which are 2" × 0.125" chips molded at 600° F. from clear non-bulk-stabilized polycarbonate are treated as follows:

| Sample | | Treatment | Solution |
|---|---|---|---|
| 1 | None | | None |
|   | (1) | 15 minutes immersion in solution | Solution A |
|   | (2) | 10 minutes drain in air at room temperature | |
|   | (3) | 5 minutes heating at 250° F | |
|   | (4) | cooling to room temperature | |
| 3 | (1) | 10 minutes immersion in solution | Solution B |
|   | (2) | 10 minutes drain in air at room temperature | |
|   | (3) | 5 minutes heating at 250° F | |
|   | (4) | Cooling to room temperature | |
| 4 | (1) | 60 minutes immersion in solution | Solution B |
|   | (2) | 10 minutes drain in air at room temperature | |
|   | (3) | 5 minutes heating at 250° F | |
|   | (4) | cooling to room temperature | |

These samples are then exposed to xenon arc radiation in a Weather-O-Meter ® (Atlas Electric Device Co.) testing device equipped for a water spray cycle and maintained per the ASTM D-2565 recommended practice for operation. Three test procedures are performed on these samples, after varying times in the Weather-O-Meter, to determine changes in optical properties, i.e., ASTM D-1925 which determines changes in the yellowness index, ASTM D-1003 which determines increase in % haze, and ASTM D-1003 which determines the % luminous transmission. The results are summarized in Tables I–III.

TABLE I

| | Change in Yellowness Index[a] | | | |
|---|---|---|---|---|
| Sample No. | Initial | 330 hrs. | 493 hrs. | 1399 hrs. |
| 1 | (4.7)[b] | 2.7 | 4.6 | 20.7 |
| 2 | (4.7)[b] | 2.8 | 4.7 | 20.3 |
| 3 | (4.9)[b] | −0.5 | −0.4 | 4.3 |
| 4 | (5.0)[b] | −1.2 | −0.8 | 3.5 |

[a]Positive values correspond to what is visually perceived as yellowing, negative values indicate bleaching or development of a bluish hue compound to the original color.
[b]Initial values.

TABLE II

| | Increase in % Haze | |
|---|---|---|
| Sample No. | Initial | 1399 hrs. |
| 1 | 2.6 | 17.6 |
| 2 | 2.6 | 10.8 |
| 3 | 3.0 | 7.9 |
| 4 | 2.6 | 8.6 |

TABLE III

| | % Luminous Transmission | |
|---|---|---|
| Sample No. | Initial | 1399 hrs. |
| 1 | 88.8 | 80.6 |
| 2 | 89.0 | 83.8 |
| 3 | 88.6 | 87.4 |
| 4 | 88.6 | 87.7 |

The particular surface impregnation efficacy of the aforedescribed butyl acrylate/2-butoxy ethanol solution containing the ultraviolet light absorbent is shown by the contrasting results obtained with an alternate impregnation solution. Toluene, as is butyl acrylate, is a solvent for many of the ultraviolet light stabilizers used in the instant compositions and like butyl acrylate will attack polycarbonate and cause it to swell. However, surface treatments of polycarbonate molded chips with a 7.5%, by volume, toluene in 92.5%, by volume, 2-butoxyethanol solution of various ultraviolet light stabilizers did not retard the yellowing of the unstablized polycarbonate sample upon exposure to ultraviolet radiation.

Sample 5, which consists of 2" × 3" 0.125" chips molded at 600° F. from clear non-bulk-stabilized polycarbonate is immersed for 15 minutes in a solution containing 7.5% by volume of toluene, 92.5% by volume of 2-butoxyethanol, and 7% by weight of Cyasorb 5411. The sample is then drained for 10 minutes in air at room temperature, heated for five minutes at 250° F., and cooled to room temperature. Sample 6 is likewise prepared from 2" × 0.125" chips molded at 600° F. from clear non-bulk-stabilized polycarbonate. Sample 6 is untreated and serves as the control. Both samples 5 and 6 are exposed to ultraviolet radiation in the manner aforedescribed.

The initial yellowness index, obtained in accordance with ASTM D1925, and the yellowness index after specified hours of exposure to ultraviolet radiation of Samples 5 and 6 are shown in Table IV below.

TABLE IV

| | Yellowness Index | | |
|---|---|---|---|
| Sample No. | Initial | 24 Hrs. | 48 Hrs. |
| 5 | 5.1 | 7.9 | 10.3 |
| 6 | 5.1 | 8.1 | 11.7 |

Thus, it is seen that not any swelling agent is effective in the present invention, but that it is the particular combination of an acrylate swelling agent, hydroxy ether mitigating agent, and ultraviolet light absorbent that, when applied to a polycarbonate article, results in the surface impregnation of the polycarbonate by the ultraviolet light absorbent thereby resulting in an ultraviolet light stabilized polycarbonate article.

What is claimed as new and desired to be secured by Letters Patent of the United States is:

1. A process for the manufacture of an aromatic polycarbonate article having improved resistance to degradation by ultraviolet light which comprises the steps of: I contacting said article with an impregnating solution containing
   (i) an ester of acrylic acid represented by the formula $$CH_2 = CHCOOR$$

wherein R is an alkyl containing from 1 to about 8 carbon atoms,
   (ii) a hydroxy ether represented by the general formula $$HO-R'-O-R^2$$

wherein R' is selected from the group consisting of $-CH_2CH_2-$, $-C_3H_6-$, and $-(R^3O)_{\overline{n}}$ wherein $R^3$ is $-C_2H_2-$ or $-C_3H_6-$ and n is an integer having a value of from 1 to 3, and $R^2$ is an alkyl containing from 1 to about 8 carbon atoms, and (iii) an ultraviolet light absorbent, said impregnating solution containing amounts of said ester of acrylic acid and hydroxy ether effective to sufficiently modify the surface of said polycarbonate to effectuate impregnation thereof by said ultraviolet light absorbent but insufficient to substantially deleteriously affect said polycarbonate; II keeping said impregnating solution in contact with said article for a period of time sufficient for said ultraviolet light absorbent to impregnate the surface of said article but insufficient to substantially deleteriously affect the surface of said polycarbonate article; and III removing said impregnating solution containing said ester of acrylic acid, hydroxy ether, and any unabsorbed ultraviolet light absorbent from said article.

2. The process of claim 1 wherein said ultraviolet light absorbent is selected from the group consisting of benzophenones, and benzotriazoles.

3. A process of claim 5 wherein the impregnating solution contains from about 1 to about 50 volume percent of the acrylate swellng agent and from about 50 to about 99 volume percent of the hydroxy ether mitigating agent.

4. The process of claim 2 wherein said ester of acrylic acid is butylacrylate.

5. The process of claim 4 wherein said hydroxy ether is 2-butoxyethanol.

* * * * *

UNITED STATES PATENT AND TRADEMARK OFFICE
CERTIFICATE OF CORRECTION

PATENT NO. : 4,146,658
DATED : Mar. 27, 1979
INVENTOR(S) : James Stevenson Humphrey, Jr.

It is certified that error appears in the above-identified patent and that said Letters Patent are hereby corrected as shown below:

Column 1, line 2, "particulary" should read --- particularly ---;

Column 5, line 42, "2" x 0.125"" should read --- 2" x 3" x 0.125" ---;

Column 6, line 53, "2" x 0.125"" should read --- 2" x 3" x 0.125" ---;

Column 8, Claim 3, line 1, "5" should read --- 2 ---.

Signed and Sealed this

Seventh Day of August 1979

[SEAL]

Attest:

LUTRELLE F. PARKER
Attesting Officer    Acting Commissioner of Patents and Trademarks